United States Patent [19]

Arya

[11] 3,767,962

[45] Oct. 23, 1973

[54] TELEVISION CONVERGENCE SYSTEM

[75] Inventor: Manohar L. Arya, Chicago, Ill.

[73] Assignee: Warwick Electronics Inc., Chicago, Ill.

[22] Filed: Jan. 3, 1972

[21] Appl. No.: 214,883

[52] U.S. Cl. .............................................. 315/13 C
[51] Int. Cl. .............................................. H01j 29/50
[58] Field of Search ............. 315/13 C, 21 C, 27 TD

[56] References Cited

UNITED STATES PATENTS

| | | | |
|---|---|---|---|
| 3,491,261 | 1/1970 | Hill et al. | 315/13 C |
| 3,382,400 | 5/1968 | Hart | 315/13 C |
| 3,440,479 | 4/1969 | Brockmann | 315/13 C |

*Primary Examiner*—Carl D. Quarforth
*Assistant Examiner*—J. M. Potenza
*Attorney*—Axel A. Hofgren et al.

[57] ABSTRACT

A vertical dynamic convergence circuit for the three convergence electromagnets associated with the R, B and G color beams of a tri-color CRT is energized by a single vertical deflection sawtooth waveform from a winding on the vertical output transformer. A pair of diodes separate the positive and negative portions of the sawtooth for coupling to a combined R and G beam control network, and a parallel connected B beam control network. The combined network includes a transistor emitter-follower for controlling the amplitude of one portion of the sawtooth, while isolating any effect on the other portion of the sawtooth.

10 Claims, 1 Drawing Figure

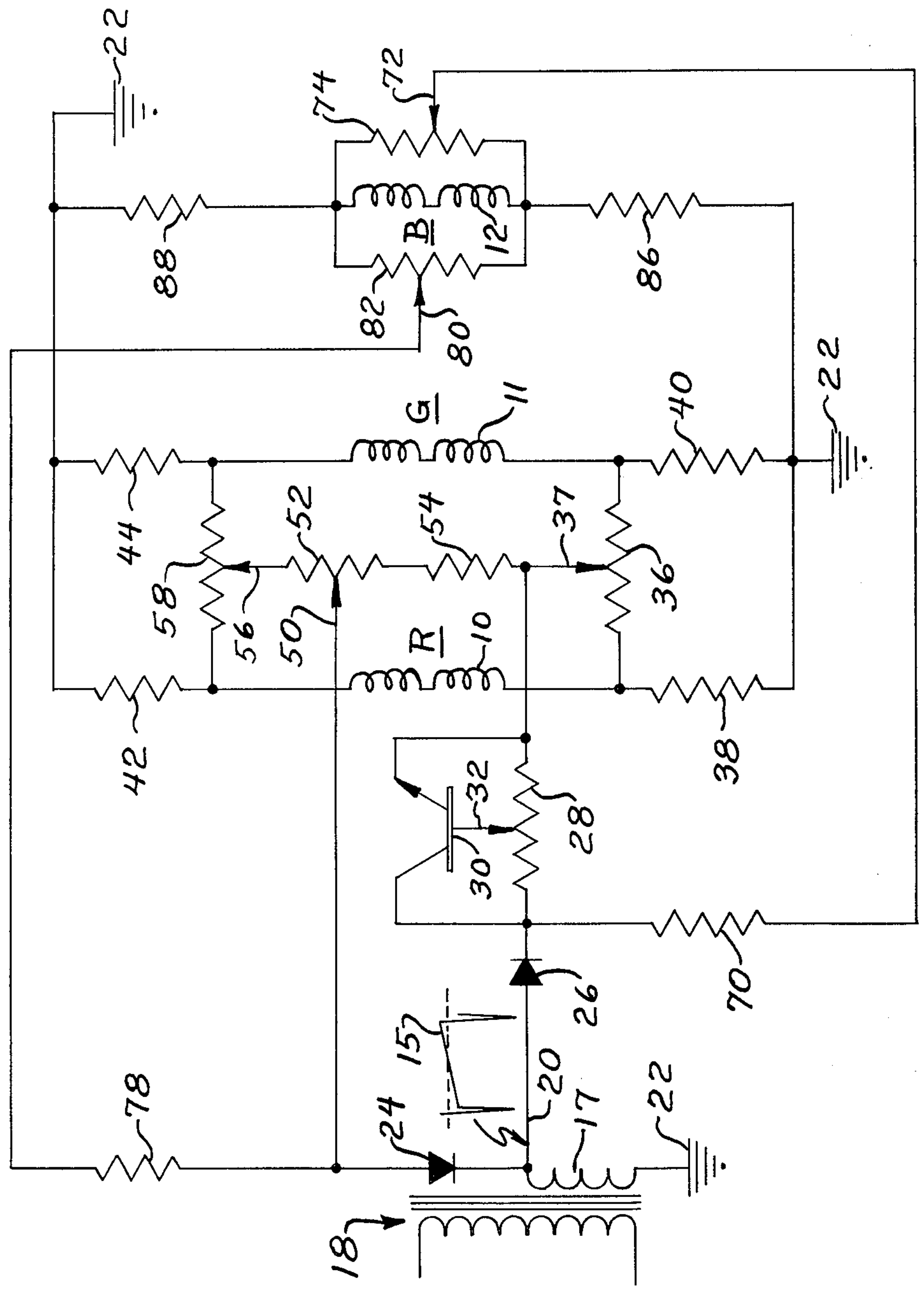

TELEVISION CONVERGENCE SYSTEM

BACKGROUND OF THE INVENTION

This invention relates to an improved convergence circuit for a color television receiver.

The majority of dynamic convergence circuits have used passive elements, such as resistors, inductors, and capacitors, in a deflection control network coupled to the R, G and B convergence electromagnets for a tri-color CRT. Such circuits causes transistor 30 require a sawtooth waveform and a parabolic waveform to accomplish convergence. The use of passive elements and the need for two waveforms generally results in significant interaction between the various controls, such as top versus bottom, and tilt versus amplitude. Generally, the amplitude and tilt controls interact with one another, requiring a technician to adjust and readjust these controls several times. Since the controls are not pure amplitude and pure tilt controls, adjustment of either control requires adjustment of the other control. A further complication for the convergence set-up relates to the fact that the effect of such a prior tilt control is different for different positions of the amplitude control. At some extreme setting of these controls, they interchange their functions, and it therefore has been essential to determine the center of the useful range of the tilt control to insure proper operation of the amplitude control.

Prior convergence circuits also tended to produce static convergence errors, due to changes in amplitude of the low point of the input parabolic wave. This low point or trough occurs at the center of the screen where convergence is often obtained by adjusting fixed magnets. A change in amplitude would generally also change the DC level of the AC waveform, resulting in a change in center convergence. These interactions between the dynamic and static convergence apparatus has made adjustment of the convergence system a very difficult and time consuming operation.

SUMMARY OF THE INVENTION

In accordance with the present invention, an improved dynamic convergence system requires the use of only a single driving waveform. A combination of diodes and a transistor, as will appear, almost completely eliminates interaction between the convergence controls, and further eliminates static convergence errors. Although the circuit is extremely straightforward and uses a minimum number of components, the resulting convergence operation is simpler due to minimized interaction between controls, while also increasing the range of the tilt and amplitude controls.

The above results are obtained by a unique combination of elements and waveforms which, individually, have each been utilized in prior convergence circuits. The particular combination of a pair of rectifiers for separating a single sawtooth deflection signal, and isolation impedance means for controlling the amplitude of one of the separated signals, provides a greatly improved convergence apparatus.

One object of this invention is the provision of an improved dynamic convergence circuit using a single input waveform, and improved means for separating and isolating the single waveform to prevent interaction between a plurality of convergence controls.

Other objects and features of the invention will be apparent from the following description and from the drawings. While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values will be given for certain of the components in order to disclose a complete, operative embodiment of the invention. However, it should be understood that such values are merely representative and are not critical unless specifically so stated.

BRIEF DESCRIPTION OF THE DRAWING

The single FIGURE shows an improved dynamic convergence circuit for the three convergence electromagnets of a tri-color television cathode ray tube.

DESCRIPTION OF THE PREFERRED EMBODIMENT

Turning to the single FIGURE, a dynamic convergence circuit is illustrated for applying convergence currents to vertical convergence electromagnets 10, 11 and 12 for the red R, green G and blue B color beams, respectively. The color beams may be generated by a conventional tri-color cathode ray tube or CRT in a color television receiver. The CRT may have a deflection angle of 90°, for example. Only the vertical dynamic convergence circuit has been illustrated, it being understood that a conventional horizontal dynamic convergence circuit would be provided. Furthermore, static convergence may be provided in a conventional manner by permanent magnets associated with each of the color beams.

The convergence circuit requires only a single vertical sawtooth waveform 15 which is available from a secondary winding 17 of a conventional vertical output transformer 18 in the color television receiver. The secondary winding 17 is coupled between an output lead 20 and a source of reference potential or ground 22. Although the vertical deflection waveform 15, on output lead 20 with respect to ground, is primarily a sawtooth, it also contains some parabolic correction as is required for vertical linearity on the color CRT. Since the dynamic vertical convergence circuit is largely inductive, the sawtooth waveform 15 is reshaped and converted into a generally parabolic current which causes the convergence electromagnets 10, 11 and 12 to correct for misconvergence.

A pair of rectifiers or diodes 24 and 26 separate the vertical sawtooth waveform 15 into negative and positive halves or portions, as illustrated below and above the dashed line which represents AC zero axis. The positive half of the sawtooth, and an accompanying +1.5 volt DC component, forward biases diode 26 and is applied to a 500 ohm potentiometer resistance 28 and a collector electrode of a NPN transistor 30. The opposite end of the fixed resistance 28 is connected to the emitter-electrode of transistor 30, and a control wiper 32 of the potentiometer is connected to the base electrode of the transistor.

Transistor 30 functions as an emitter-follower and thus presents a high input impedance and a low output impedance. Moving the adjustable amplitude control wiper 32 towards the emitter turns the transistor 30 off, whereas moving the control wiper towards the collector causes a forward bias which turns the transistor on. When the transistor is turned on, the positive half of the sawtooth voltage is obtained at the emitter of the transistor and applied through a first resistive network to the red R and green G vertical convergence coils 10 and 11. When the transistor 30 is turned off, no positive going correction voltage is applied to the vertical convergence coils, and misconvergence will be apparent. The transistor 30 serves as a variable conductance signal translating control means which has a high input impedance and a low output impedance in series with diode 26 in order to provide amplitude control of the convergence signal coupled to windings 10 and 11, while reducing the interaction between the remaining amplitude and differential controls.

The operation of transistor 30 can be compared to a double-diode control in which the wiper 32 is connected to the anode of two diodes. The cathode of one diode would be connected to one side of the resistor 28, whereas the cathode of the other diode would be connected to the opposite side of the resistor 28. As the slider 32 is moved towards positive voltage as present at the junction between diode 26 and resistor 28, the anode of the base emitter corresponding diode would go positive with respect to the cathode, forward biasing the diode and causing it to conduct. Moving the slider 32 away from the positive voltage decreases forward bias across the corresponding base-emitter diode, causing the diode (and hence the transistor) to turn off.

The resistive circuit for the R and G coils 10 and 11 comprises a 120 ohm potentiometer 26, serving as a differential control, and having its wiper 37 directly connected to the emitter of transistor 30. One end of the potentiometer resistance 36 is connected both to the R coil 10, and through a 220 ohm resistor 38 to ground 22. The opposite end of the fixed resistor 36 is connected to the G coil 11, and through a 120 ohm resistor 40 to ground 22. To complete a current path for the coils, the opposite end of the R coil 10 is coupled through a 330 ohm resistor 42 to ground 22, whereas the opposite end of the G coil 11 is coupled to a 330 ohm resistor 44 to ground 22.

The diode 24 is coupled between the output lead 20 and a wiper 50 of a 350 ohm potentiometer resistance 52. One end of the resistance 52 is coupled through a 180 ohm resistor 54 to the junction between the collector of transistor 30 and wiper 37. The other end of the resistor 52 is coupled to the wiper 56 of a 500 ohm potentiometer resistance 58, serving as a differential control, and coupled between the pair of junctions between coil 10 and resistor 42, and coil 11 and resistor 44.

Adjustment of potentiometer 28 affects the lower half of the CRT screen. A slight interaction between the lower half and the upper half of the screen will be observed as this control is adjusted. When wiper 32 is adjusted toward the emitter, transistor 30 will be turned off. Misconvergence of the vertical cross-hatch lines in the lower half of the screen will be quite noticeable for the G and R vertical lines. Moving the control wiper 32 towards the collector causes30 to conduct. The positive going sawtooth voltage applied to the R convergence coil 10 and G convergence coil 11 will simultaneously affect the R and G beams. As the control wiper 32 nears the center of its control range, the R and G vertical cross-hatch lines in the lower half of the screen will converge and, for a particular setting, superimpose on each other.

If the control wiper 32 is moved further towards the collector, misconvergence of the R and G vertical cross-hatch lines in the lower half of the screen will occur, but the R and G vertical lines will have interchanged positions with respect to the positions initially noted when the control wiper 32 was towards the emitter.

Adjustment of amplitude control potentiometer 52 will converge the R and G vertical cross-hatch lines in the top half of the screen, and little or no interaction will be observed in the lower half of the screen. That is, the negative half of the sawtooth waveform 15, and an accompanying −1.5 volts DC component, will forward bias diode 24 and be applied to the wiper 50 of potentiometer 52. This negative correction voltage is applied through the resistive network to the R and G vertical convergence coils 10 and 11. Potentiometer 36 will, by movement of wiper 37, correct the misconvergence along the horizontal cross-hatch lines in the lower half of the screen. Similarly, potentiometer 58 will, by adjustment of wiper 56, correct the misconvergence along the horizontal cross-hatch lines in the top half of the screen.

Some interaction will be observed in the top half of the screen when potentiometer 36 is adjusted to correct misconvergence in the bottom half of the screen, but little or no interaction will be observed when potentiometer 58 is adjusted to correct the misconvergence in the top half of the screen. Since the time constant of the R and G convergence coils is about three milliseconds, a change in the pulse voltage will change the waveform only for the beginning of the scan. Changing the top controls therefor has a minimum effect on the lower half of the CRT.

Interaction between controls is minimized by separating the vertical blue control functions from the combined red and green vertical control functions. The separated positive and negative sawtooth waveforms are applied to the vertical blue convergence coil 12 through a second network separate from the above described red and green network. The positive waveform through diode 26 is coupled through an overload preventing 150 ohm resistor 70 to the wiper 72 of a 350 ohm potentiometer 74 coupled across the blue coil 12. Similarly, the negative sawtooth voltage through diode 24 is coupled through an overload preventing 150 ohm resistor 78 to a wiper 80 of a 350 ohm potentiometer 82 coupled across the blue coil 12. Each side of the coil 12 is coupled through a separate 150 ohm resistor 86 or 88 to ground 22.

Adjustment of potentiometer 74 will raise or lower the blue horizontal cross-hatch lines in the lower half of the screen. Conversely, adjustment of potentiometer 82 will raise or lower the blue horizontal cross-hatch lines in the top half of the screen. Some interaction may be observed as potentiometer 74 is adjusted, similar to the R/G system change, but little or no interaction will occur when potentiometer 82 is adjusted.

The convergence procedure and sequence of adjustments are similar to prior convergence systems. The controls affecting the lower half of the screen should be adjusted first. A typical convergence set-up procedure would be as follows. Potentiometer 28 is adjusted to converge the R and G vertical cross-hatch lines in the lower half of the screen, after which potentiometer 52 is adjusted to converge the vertical R and G lines in the top half of the screen. Potentiometer 36 is then adjusted to control the lower half, and then potentiometer 58 to control the top half. Potentiometer 74 is then controlled to adjust the B horizontal cross-hatch lines in the lower half of the screen, and then potentiometer 82 is controlled to adjust the B horizontal cross-hatch lines in the top half of the screen. Adjustment of the vertical dynamic convergence circuit, as illustrated, will not alter a conventional horizontal dynamic convergence circuit.

Diodes 24 and 26 are thus utilized for all three of the convergence coils. Each diode may comprise a silicon rectifier which requires about 0.6 volts thereacross to allow conduction. This characteristic prevents any current flow in the three convergence windings at the zero crossing point of waveform 15, that is, adjacent the dashed line which corresponds to AC zero axis. Since the zero crossing point also corresponds to the center of the screen, the diodes prohibit current flow in the convergence windings which would upset the static convergence provided by a separate static convergence apparatus, not illustrated. The diodes also function to a degree to eliminate interaction between the top half and bottom half controls for the screen. Although both diodes are used for all three convergence coils, the B convergence network is in parallel with the combined R/G convergence network, and hence no interaction occurs between the B and R/G circuits.

I claim:

1. In a color television receiver having a plurality of convergence windings associated with a plurality of color beams and source means for generating a sawtooth shaped deflection signal with relatively positive and negative portions, an improved convergence circuit comprising:

first network means for connecting said source means to a pair of said convergence windings, including first diode means for coupling one of said portions of said deflection signal to said pair of convergence windings, variable signal translating control means having a high input impedance and a low output impedance and coupled in series with said first diode means to provide amplitude control of said one signal portion, and adjustable differential control means for differentially adjusting said one signal portion applied to said pair of convergence windings; and second network means for connecting said source means to said pair of convergence windings, including second diode means for coupling the other of said portions of said deflection signal to said pair of windings, and adjustable control means for adjusting the amplitude of and differentially adjusting said other signal portion applied to said pair of convergence windings.

2. The convergence circuit of claim 1 wherein said variable signal translating control means comprises transistor means, variable impedance means, and means connecting said transistor means and variable impedance means in series with said first diode means to produce an emitter coupled transistor circuit having a high input impedance to said first diode means and a low output impedance to said pair of convergence windings.

3. The convergence circuit of claim 2 wherein said transistor means has first, second and control electrodes, said variable impedance means comprises potentiometer means having a wiper terminal movable across a fixed resistance between a pair of output terminals, and said connecting means couples said first and second electrodes across said output terminals and said control electrode to said wiper terminal.

4. The convergence circuit of claim 2 wherein said first network means couples said adjustable differential control means between said emitter coupled transistor circuit and said pair of convergence windings.

5. The convergence circuit of claim 1 wherein the adjustable control means in said second network means comprises second adjustable amplitude control means for adjusting the amplitude of said other signal portion coupled to said pair of convergence windings and second adjustable differential control means for differentially adjusting the other signal portion applied to said pair of convergence windings.

6. The convergence circuit of claim 5 wherein said second adjustable amplitude control means comprises potentiometer means having a wiper movable across a fixed resistance, means coupling said wiper to said second diode means, means coupling one side of said fixed resistance to said second adjustable differential control means, and means coupling the other side of said fixed resistance to said first network means.

7. The convergence circuit of claim 6 wherein said second adjustable differential control means comprises potentiometer means having a fixed resistance coupled between said pair of convergence windings and a wiper coupled to said one side of said adjustable amplitude control means, and said first network means comprises potentiometer means having a fixed resistance coupled between said pair of convergence windings and a wiper coupled to said other side of said resistor, said last named potentiometer means corresponding to the adjustable differential control means in said first network means.

8. The convergence circuit of claim 1 including third network means for connecting said source means to a third convergence winding, including first variable impedance means connected between said third convergence winding and said first diode means, and second variable impedance means connected between said third convergence winding and said second diode means.

9. The convergence circuit of claim 8 wherein each of said variable impedance means comprises potentiometer means having a fixed resistance in parallel with said third convergence winding and a wiper coupled to the respective diode means associated therewith.

10. The convergence circuit of claim 9 wherein said third network means includes a pair of overload preventing resistance means each respectively coupled between the wiper of a different potentiometer means and the diode means associated therewith.

* * * * *